United States Patent [19]

Miyao et al.

[11] Patent Number: 5,067,070
[45] Date of Patent: Nov. 19, 1991

[54] WORD PROCESSOR WITH OPERATOR INPUTTED CHARACTER STRING SUBSTITUTION

[75] Inventors: Kouji Miyao, Kashihara; Hajime Asano, Nara, both of Japan

[73] Assignee: Sharp Kabushiki Kaisha, Osaka, Japan

[21] Appl. No.: 577,816

[22] Filed: Sep. 4, 1990

Related U.S. Application Data

[63] Continuation of Ser. No. 222,770, Jul. 22, 1988, abandoned.

[30] Foreign Application Priority Data

| Jul. 22, 1987 | [JP] | Japan | 62-184128 |
| Jul. 30, 1987 | [JP] | Japan | 62-192976 |
| Aug. 1, 1987 | [JP] | Japan | 62-193002 |

[51] Int. Cl.⁵ .......................... G06F 7/00; G06F 15/20
[52] U.S. Cl. .................................... 395/146; 364/419; 364/225.8; 364/DIG. 1
[58] Field of Search ................ 364/200, 900, 419; 400/63

[56] References Cited

U.S. PATENT DOCUMENTS

| 4,270,865 | 6/1981 | Konishi | 400/63 |
| 4,384,329 | 5/1983 | Rosenbaum et al. | 400/63 |
| 4,773,039 | 9/1988 | Zamora | 364/900 |

FOREIGN PATENT DOCUMENTS

| 0093249 | 3/1983 | European Pat. Off. |
| 0093250 | 3/1983 | European Pat. Off. |
| 0233996 | 10/1986 | European Pat. Off. |
| 0228913 | 12/1986 | European Pat. Off. |
| 60-15181 | 1/1985 | Japan |

OTHER PUBLICATIONS

*IBM Technical Disclosure Bulletin*, vol. 28, No. 4, Sep. 1985, pp. 1623-1628, "Method for Creating Annotation Data".
*IBM Technical Disclosure Bulletin*, vol. 27, No. 10A, Mar. 1985, p. 5864, "Optimal Printing of Comment Data".
*IBM Technical Disclosure Bulletin*, vol. 29, No. 9, Feb. 1987, "Gedit, A Generic-Markup Document Editor", pp. 3996-3998.
*IBM Technical Disclosure Bulletin*, vol. 29, No. 7, Dec. 1986, p. 2874, "Method of Tracking Revisions in Large Documents".

*Primary Examiner*—Lawrence E. Anderson

[57] ABSTRACT

An operator can use a word processor for editing by substituting character strings. The operator can use a designating part of the word processor to identify what portion of a text is to be edited. The portion of the text to be edited is a designated character string. A plurality of substitute strings can be stored in a memory. The substitute character strings can replace the designated character strings. In addition, the designated character string can be placed in a memory to be used later as a substitutive character string.

19 Claims, 16 Drawing Sheets

FIG. 1

PARTICULARLY, THIS WORD PROCESSOR POSSESSES A SIMPLE OPERATIVITY, AND .....

FIG. 2

PARTICULARLY, THIS WORD PROCESSOR IS EASY IN OPERATION, AND .....

FIG. 3

PARTICULARLY, THIS WORD PROCESSOR IS EASY TO OPERATE, AND .....

FIG. 7

PARTICULARLY, THIS WORD PROCESSOR POSSESSES A SIMPLE OPERATIVITY, AND .....
IS AN ARTICLE OF A LOW PRICE .....

FIG. 8

<E> PARTICULARLY, THIS WORD PROCESSOR IS EASY TO OPERATE, AND .....

▶ IS EASY TO OPERATE
▷ IS EASY IN OPERATION
▷ POSSESSES A SIMPLE OPERATIVITY

W2
▶ IS EASY TO OPERATE
▷ IS EASY IN OPERATION
▷ POSSESSES A SIMPLE OPERATIVITY
<E>

THE WORD PROCESSOR IS EASY TO OPERATE, AND .....
<E> IS CHEAP

▶ IS CHEAP
▷ IS AN ARTICLE OF A LOW PRICE
W1

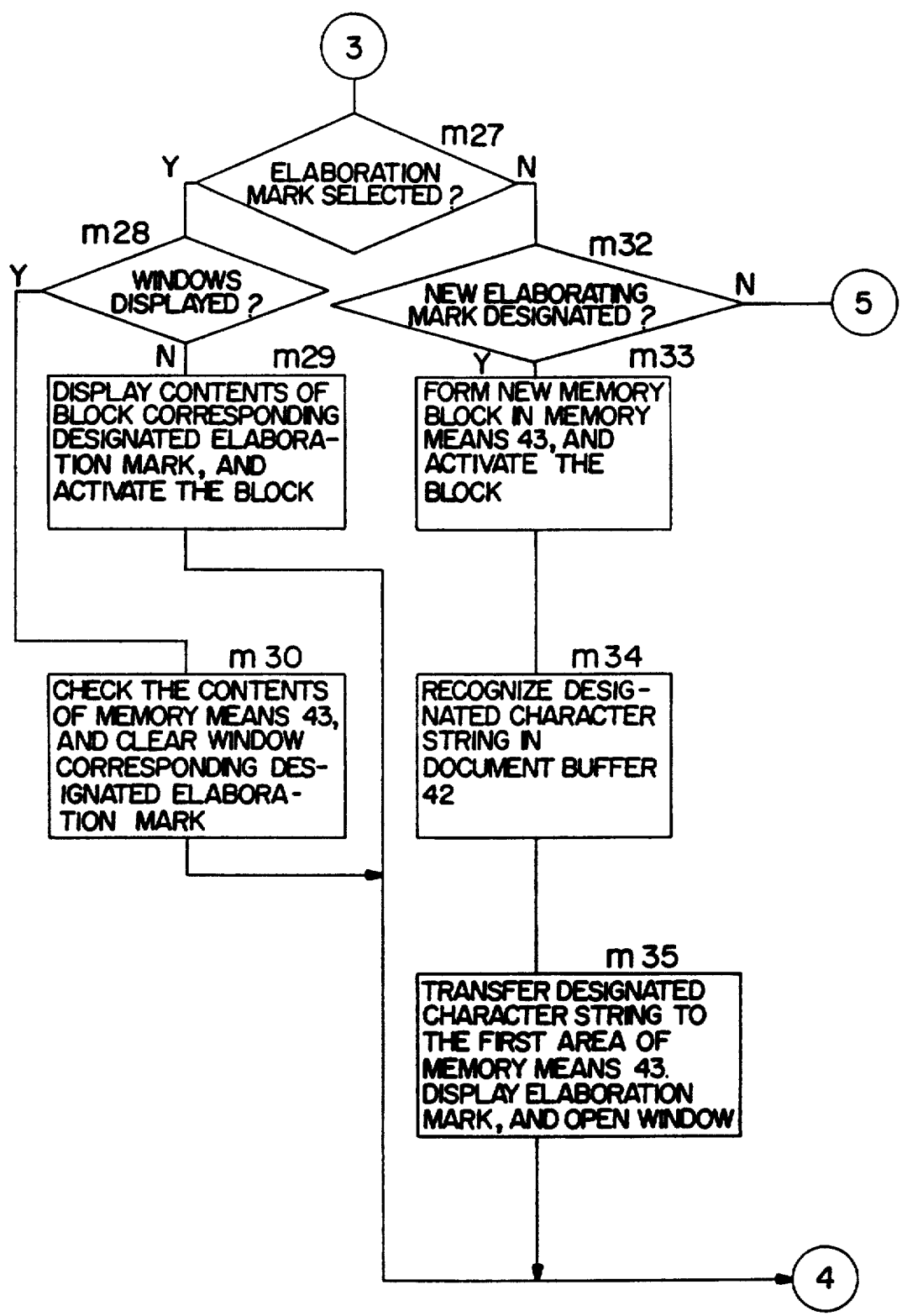

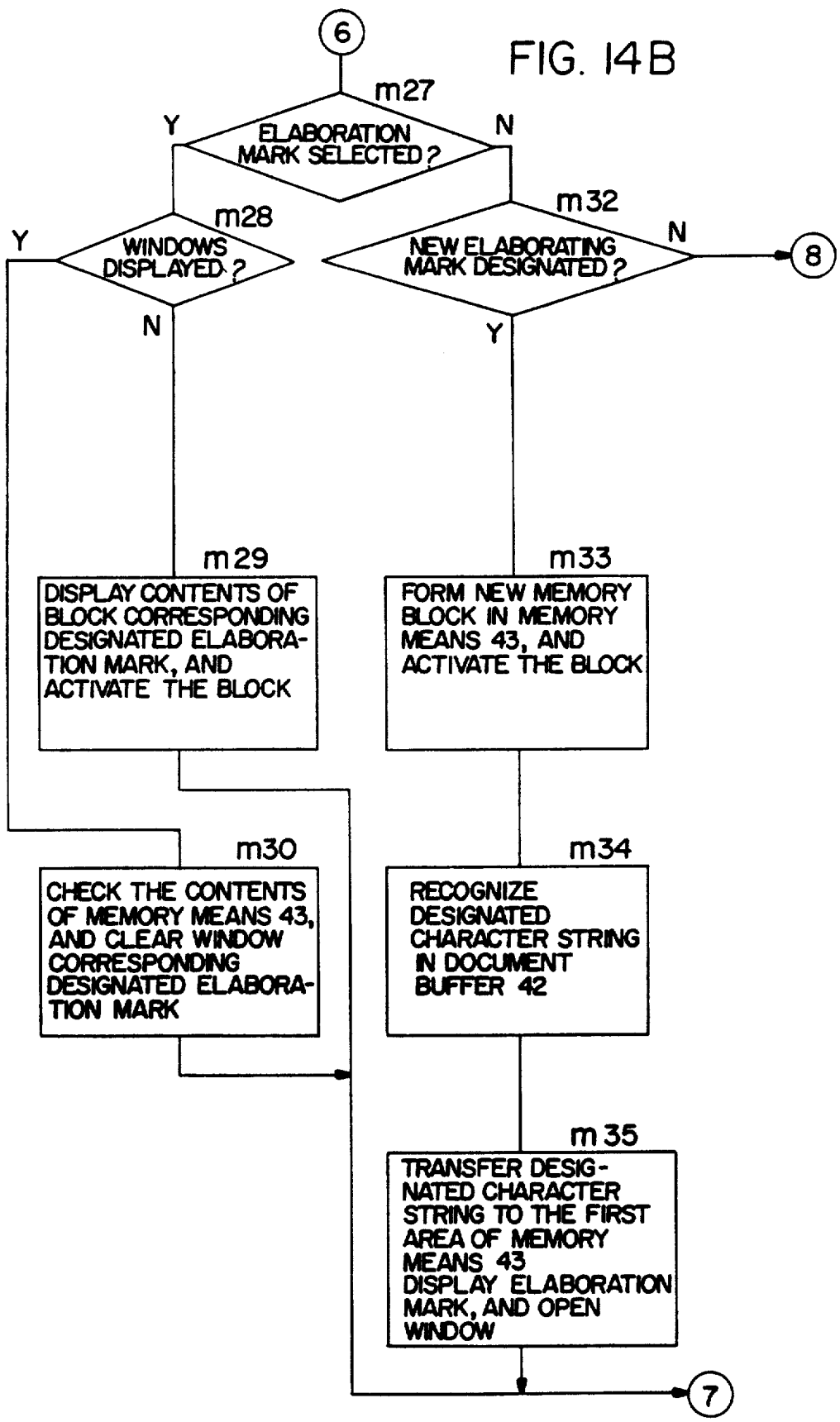

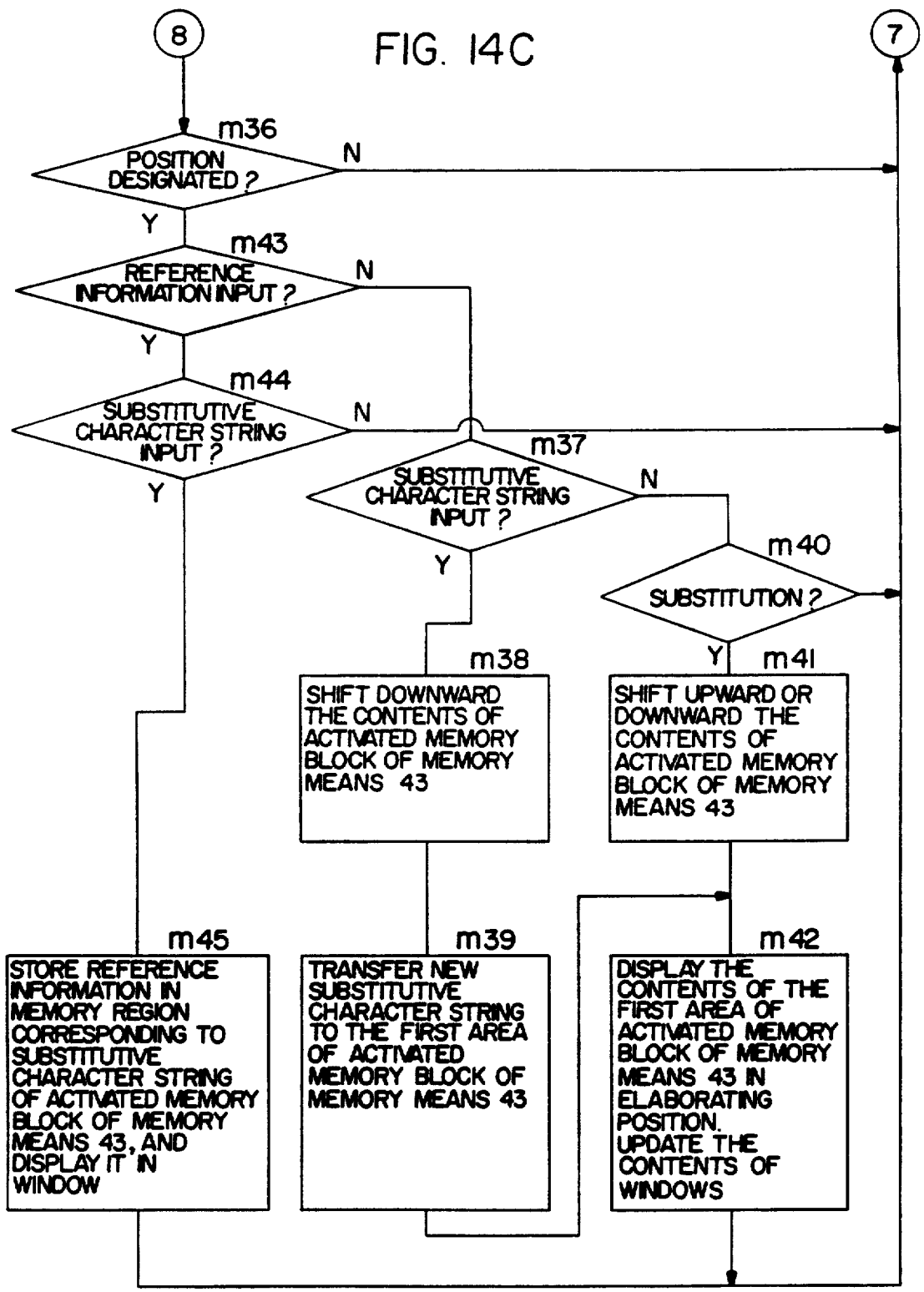

WORD PROCESSOR WITH OPERATOR INPUTTED CHARACTER STRING SUBSTITUTION

This application is a continuation of application Ser. No. 07/222,770 filed on July 22, 1988, now abandoned.

BACKGROUND OF THE INVENTION

1. Field of the Invention

This invention relates to a word processor, more particularly to improvements of a word processor which are effective in selecting one expression from various expressions to elaborate a document or the like.

2. Art Background

There are two modes of editing of sentences using a word processor. The first one is conducted when contents of the sentences to be written have been determined. In this case, words are replaced with other more appropriate ones, or misspellings are corrected. These replacements and corrections are simple editing operations in which a certain character string in a sentence is designated and substituted with another character string. These operations can be performed by a conventional word processor.

The second mode of editing is called "elaboration", and is conducted when a certain portion of a document is to be substituted with another better expression. When elaboration is conducted, a person operating a word processor (the operator) may select the best expression from several better expressions which have been thought of by the operator. Usually, however, it is difficult to be sure about such selection. It is usually the case that the most suitable expression is selected by trial-and-error while better expressions are tentatively placed one by one in the position of the expression to be substituted and the tentatively amended documents are compared with each other.

For example, it is supposed that a character string "possesses a simple operativity" (hereinafter, referred to as "expression A1") in a document shown in FIG. 1 is to be elaborated. When other character strings "is easy in operation" (hereinafter, referred to as "expression A2") and "is easy to operate" (hereinafter, referred to as "expression A3") have been thought of by the operator as substitutes for the expression A1, the elaboration can be conducted by replacing the expressions A1, A2 and A3 with each other. Hence, each of the substitutive expressions must be input at each time when the elaboration is conducted.

Moreover, elements required in elaboration are not limited to eligible character strings. For example, features of the substitutive character strings (e.g., the expression A1: a mandarin style, the expression A3: a colloquial style, and the expression A2: an intermediate style) are also important elements in elaboration. When a single document is to be elaborated by a number of different people, it is convenient for the person who will elaborate the sentence later to record the name of the person who selected that character string and/or the reason for the selection. These fine functions are not provided it all, in prior word processors.

The document to be elaborated shown in FIG. 7 has another expression "is an article of a low price" (hereinafter, referred to "expression B1"). When another character string "is cheap" (hereinafter, referred to as "expression B2") has been thought of by the operator, the expression B2 is substituted for the expression B1 after substituting the expression A1 with the expression A2. When the operator reads the sentence as elaborated, the operator may note that the style of the elaborated sentence is inconsistent because the expression A2 is somewhat stiff while the expression B2 is colloquial. Even if the operator decides to substitute the expression A2 with the expression A3 which is colloquial, the expression A3 has been already lost from the word processor. Therefore, the operator must input again the expression A3. Namely, in a conventional word processor, one portion of the document can be elaborated at one time. When another portion begins to be elaborated after the elaboration of the one portion, all of the candidate expressions except the finally elaborated expression in the previous elaboration operation are lost. In the case that the elaborated portion is to be further elaborated as a result of the elaboration of the other portion, the candidate expressions must be input again.

In this application, the term "word processor" means a variety of computer apparatus including a so-called word processor and other apparatus which can process words and/or documents using a computer.

SUMMARY OF THE INVENTION

The word processor of this invention, which overcomes the above-discussed and numerous other disadvantages and deficiencies of the prior art, comprises a display, a designating means for designating arbitrarily a character string, an input means for inputting a plurality of substitutive character strings for said designated character string, a memory means for storing said substitutive character strings, and a substituting means for substituting said designated character string with one of said substitutive character strings.

The word processor of this invention comprises a display, a designating means for designating arbitrarily a character string, an input means for inputting a plurality of substitutive character strings for said designated character string, a memory means for storing said substitutive character strings, a first display means for displaying a mark at the vicinity of said designated character string in said display, said mark indicating that said substitutive character strings are stored in said memory means, a second display means for displaying said substitutive character strings in said display, and a substituting means for substituting said designated character string with one of said substitutive character strings.

In a preferred embodiment, the memory means stores two or more sets of said substitutive character strings.

In a preferred embodiment, the first display means displays a plurality of said marks.

In a preferred embodiment, the second display means displays two or more sets of said substitutive character strings.

The word processor of this invention comprises a display, a designating means for designating arbitrarily a character string, a first input means for inputting a plurality of substitutive character strings for said designated character string, a second input means for inputting a plurality of reference information corresponding to said substitutive character strings, a first memory means for storing said substitutive character strings, a second memory means for storing said reference information, a first display means for displaying a mark at the vicinity of said designated character string in said display, said mark indicating that said substitutive character strings are stored in said memory means, a second display means for displaying said substitutive character strings in said display and said reference information, and a substituting means for substituting said designated character string with one of said substitutive character strings.

In a preferred embodiment, the first memory means stores two or more sets of said substitutive character strings, and said second memory means stores two or more sets of said reference information corresponding to said substitutive character strings.

In a preferred embodiment, the first display means displays a plurality of said marks.

In a preferred embodiment, the second display means displays two or more sets of said substitutive character strings and also two or more sets of said reference information corresponding to said substitutive character strings.

Thus, the invention described herein makes possible the objectives of (1) providing a word processor by which an operator can conduct easily the elaboration; (2) providing a word processor which can store and display a plurality of substitutive character strings; (3) providing a word processor which can substitute repeatedly a designated character string in a document with any one of substitutive character strings; (4) providing a word processor which can substitute at any time a designated character string in a document with any one of substitutive character strings; (5) providing a word processor which can indicate the existence of substitutive character strings; and (6) providing a word processor which can display reference information with respect to substitutive character strings.

BRIEF DESCRIPTION OF THE DRAWINGS

This invention may be better understood and its numerous objects and advantages will become apparent to those skilled in the art by reference to the accompanying drawings as follows:

FIG. 1 is a diagram illustrating a display which shows a sentence to be elaborated.

FIG. 2 is a diagram illustrating a display in which one portion of the sentence is replaced with another expression.

FIG. 3 is a diagram illustrating a display in which one portion of the sentence is replaced with a further expression.

FIG. 7 is a diagram illustrating a display which shows a sentence to be elaborated in the second embodiment.

FIG. 8 is a diagram illustrating a display which shows an elaboration mark and a window indicating substitutive character strings.

FIG. 9 is a diagram illustrating a display which shows two elaboration marks and two windows indicating substitutive character strings.

FIGS. 11A to 11C are flowcharts of the second embodiment.

FIGS. 14A to 14C are flowcharts of the third embodiment.

DESCRIPTION OF THE PREFERRED EMBODIMENTS

First Embodiment

Figure 4:
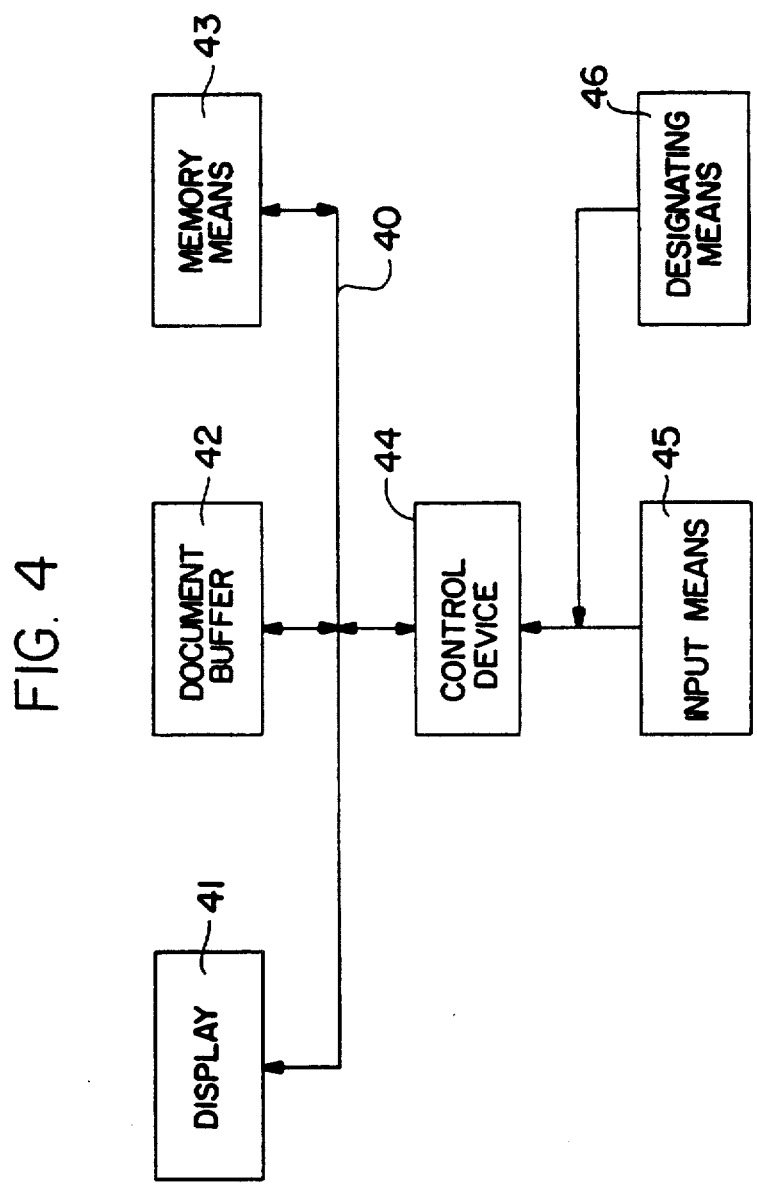
FIG. 4 is a block diagram of the first embodiment.

FIG. 4 is a block diagram showing the first embodiment of a word processor according to the invention. In the word processor of FIG. 4, a display 41, a document buffer 42, and a memory for substitutive character string 43 are connected to a control device 44 through a bus line 40. Also, an input device 45 (typically, a keyboard) and a character string designating means 46 are connected to the control device 44. The character string designating means 46 is used to designate a position or range in a document where the elaboration is to be conducted. The designating means can select a character string that is variable in size. Hereinafter, such a position or range is referred to "elaborating portion".

Figure 5A:
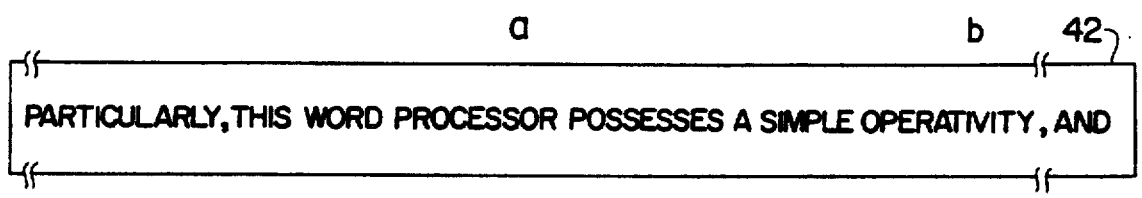
FIG. 5A is a diagram illustrating the sentence to be elaborated which is stored in a document buffer of the first embodiment.
Figure 5B:
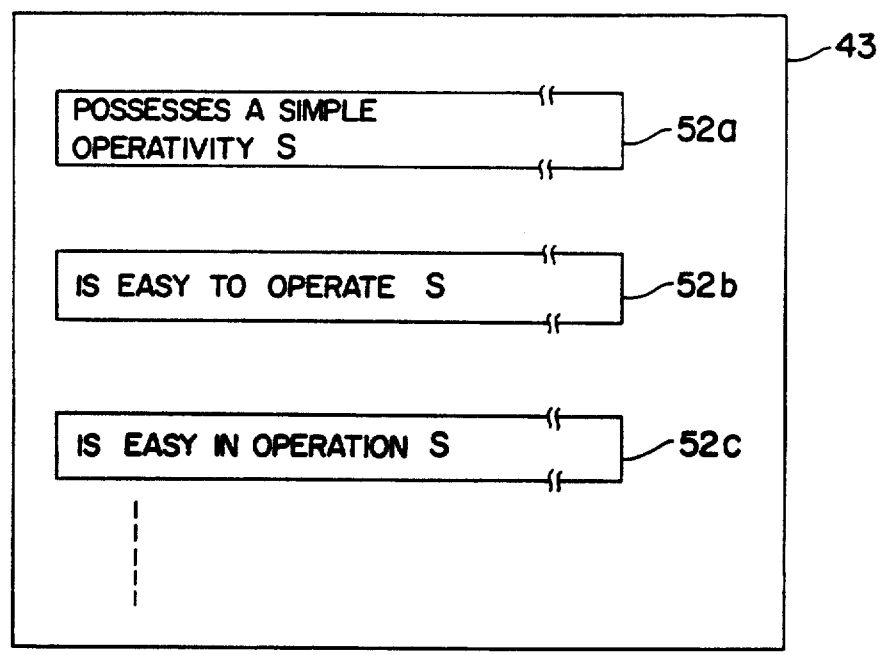
FIG. 5B is a diagram illustrating the internal arrangement of a substitutive character string memory of the first embodiment.

FIG. 5A illustrates the contents of the document buffer 42 in which the sentence shown in FIG. 1 is stored. FIG. 5B illustrates the internal arrangement of the memory 43. The memory 43 includes a plurality of memory areas 52a, 52b and 52c in which the expressions A1, A2 and A3 are stored respectively. The marks "S" in a circle appearing after the expressions A1 to A3 indicate the end of each expressions.

Figure 6A:
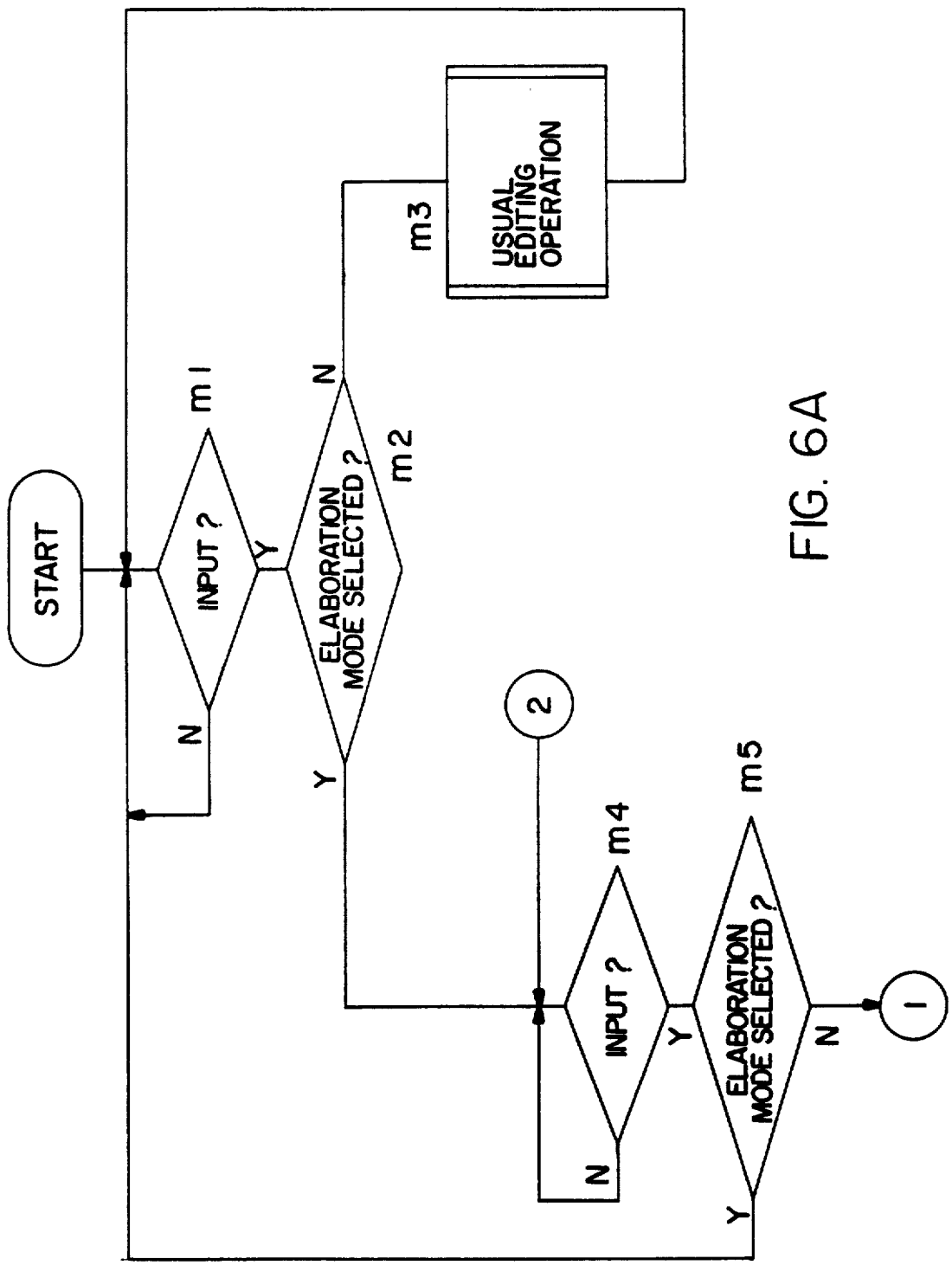
FIGS. 6A and 6B are flowcharts of the first embodiment.
Figure 6B:
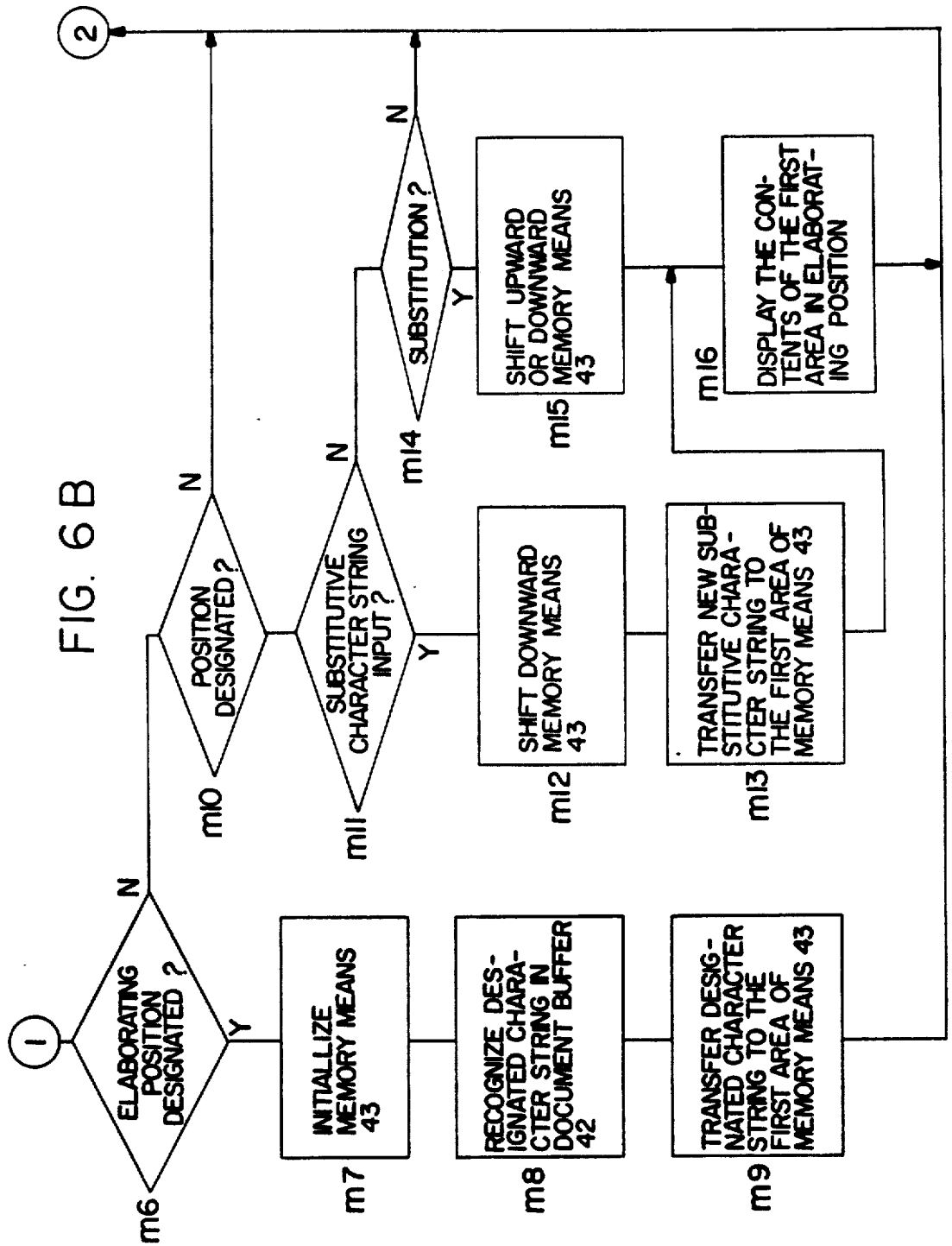

FIGS. 6A and 6B are flowcharts illustrating the operation of the embodiment. This embodiment can be realized in the form of software incorporated in an ordinary software for a word processor. The operation of the first embodiment will be described with reference to FIGS. 6A and 6B. When documents being processed by a word processor, the operator of the word processor selects the elaboration mode by pressing a function key in the input device 45 which is usually a keyboard. This selection may be done by choosing a pop-up menu using the character string designating means 46 (typically, a mouse). Until the operator selects the elaboration mode, the decision in the step m2 remains "No". The input from the device 45 or 46 is processed by the ordinary editing operation while looping around the steps m1, m2 and m3.

When the elaboration mode is selected, execution proceeds to the step m4 to become an input wait state. If the elaboration mode is selected again, execution moves to the step m1 to return to the input wait mode in the usual editing operation (step m5). When an elaborating portion is designated by the means 46, the substitutive character string memory 43 is initialized in the step m7. More specifically, the memory areas 52a, 52b and 52c are cleared, and the pointer is set to the first memory area (i.e., the memory area 52a). In step m8, a character string in the document buffer 42 is designated. Namely, in the document buffer 42 shown in FIG. 5A, the character string "possesses a simple operativity"

(expression A1) which is sandwiched by two labels a and b shown in FIG. 5A is recognized as the designated character string. The designated character string (expression A1) is transferred from the document buffer 42 to the substitutive character string memory 43 (step m9), and stored in the memory area 52a to which the pointer has been set. Thereafter, execution returns to the elaboration input wait mode in the step m4.

When the substitutive character string "is easy in operation" (expression A2) is entered by the input device 45 during the elaboration input wait mode, execution proceeds to the step m12 via the steps m4, m5, m6, m10 and m11. The step m10 is provided to ignore an input of a substitutive character string or a substitute instruction (which will be described below) when such a input is done between entering the elaboration mode and the designation of the elaborating portion.

In the step m12, the contents of the 43 are shifted downward by one step. The expression A1 "possesses a simple operativity" which has been stored in the memory area 52a is shifted to the memory area 52b to clear the memory area 52a. Then, the newly input substitutive character string "is easy in operation" (expression A2) is stored in the memory area 52a (step m13). The expression A2 "is easy in operation" which is the contents of the memory area 52a is displayed at the elaborating portion on the display 41 (step m16). Then, execution returns to the step m4.

When another substitutive character string "is easy to operate" (expression A3) is entered further, the steps m12, m13 and m16 are repeated. The expression A1 "possesses a simple operativity" which has been stored in the memory area 52b is shifted to the memory area 52c. Similarly, the expression A2 "is easy in operation" which has been stored in the memory area 52a is shifted to the memory area 52b. The expression A3 "is easy to operate" is stored in the memory area 52a, and displayed at the elaborating portion on the display 41.

The instruction to substitute the displayed expression (e.g., the expression A3) with another expression (e.g., the expression A1 or A2) is done by pressing a next candidate key or a previous candidate key. Hereinafter, this instruction is called "substitute instruction". The keys may be function keys disposed in the input device 45. When the substitute instruction is done in the elaboration mode, execution proceeds to the step m15 via the steps m4 to m6, m10, m11 and m14. Step m10 is provided, in the elaboration mode, to ignore any input other than the inputs of the elaborating portion, substitutive character strings, and substitute instruction.

In the step m15, the contents of the memory 43 are shifted upward or downward by one step in a loop manner. When the next candidate key is operated, the contents of the memory 43 are shifted downward. The expression A3 "is easy to operate" which has been stored in the memory area 52a is shifted to the memory area 52b. The expression A2 "is easy in operation" which has been stored in the memory area 52b is shifted to the memory area 52c. The expression A1 "possesses a simple operativity" which has been stored in the memory area 52c is returned to the memory area 52a. When the previous candidate key is operated, the contents of the memory 43 are shifted upward or in the reverse direction. The expression A1 "possesses a simple operativity" which is the contents of the memory area 52a is displayed again at the elaborating portion on the display 41 (step m16). Then, execution returns to the step m4. FIGS. 5A and 5B illustrate this status.

If the selection of the elaboration mode is done, execution returns to the step m1 via the steps m4 and m5 to restart the usual editing operation in which the sentence including the expression A1 stored in the memory area 52a at the final stage of the elaboration mode will be processed.

In the above-described first embodiment of the invention, the designated character string in a sentence and any one of substitutive character strings which have been separately input can be substituted with each other repeatedly. Hence, even when the operator is at a loss as to which expression is to be employed, the word processor of the embodiment can effectively assist him in elaborating sentences.

Second Embodiment

Figure 10:
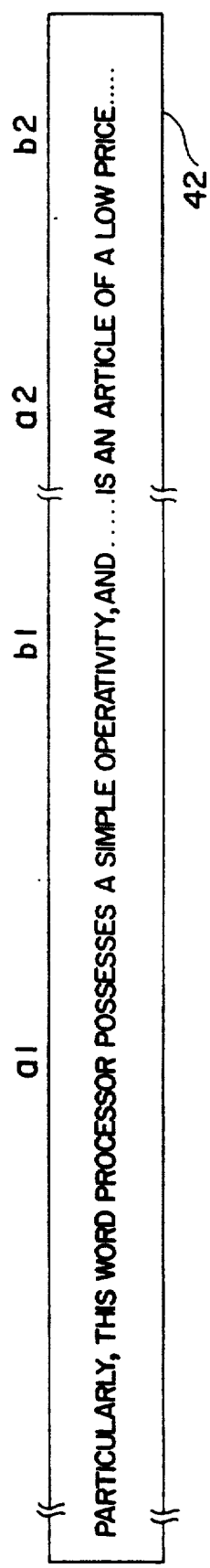
FIG. 10A is a diagram illustrating the sentence to be elaborated which is stored in a document buffer of the second embodiment.
FIG. 10B is a diagram illustrating the internal arrangement of a substitutive character string memory of the second embodiment.
Figure 10B:
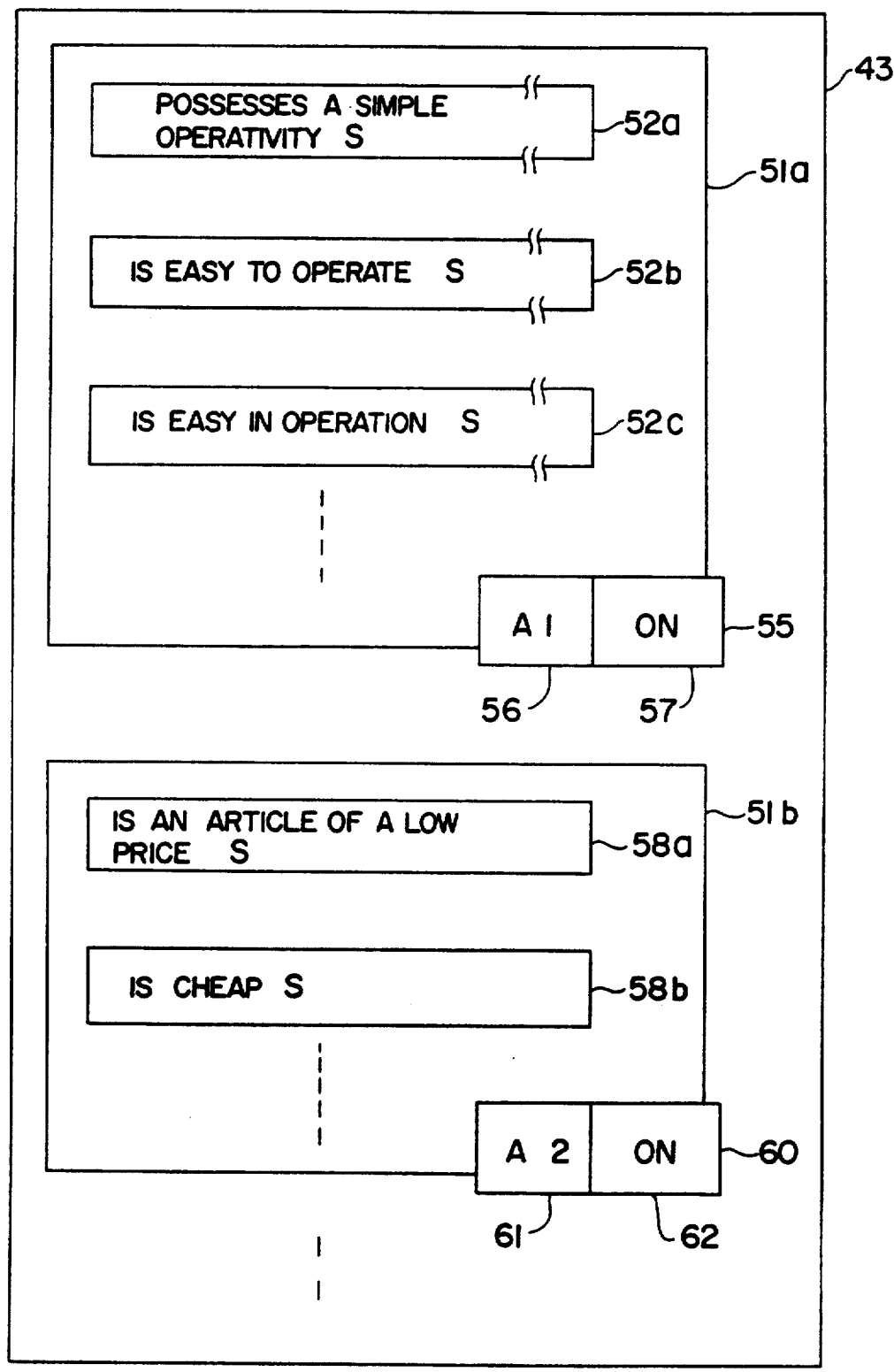

The second embodiment of a word processor according to the invention will be described. The second embodiment comprises components shown in FIG. 4. FIG. 10A illustrates the contents of the document buffer 42 of the second embodiment in which the sentence shown in FIG. 7 is stored. FIG. 10B illustrates the internal arrangement of the substitutive character string memory 43. In this embodiment, the memory 43 has a plurality of memory blocks 51a and 51b in which the memory areas 52a, 52b and 52c and 58a and 58b are provided as shown in FIG. 10B. The memory blocks 51a and 51b have also memory portions 56 and 61 and flags 57 and 62. The memory portions 56 and 61 store a positional information (e.g., the label a1 or a2 appearing in FIG. 10A) of the beginning of an elaborating portion. The flag 57 or 62 indicates whether the contents of the memory area 51a or 51b are displayed in the windows W1 or W2 (FIG. 9).

Figure 11A:
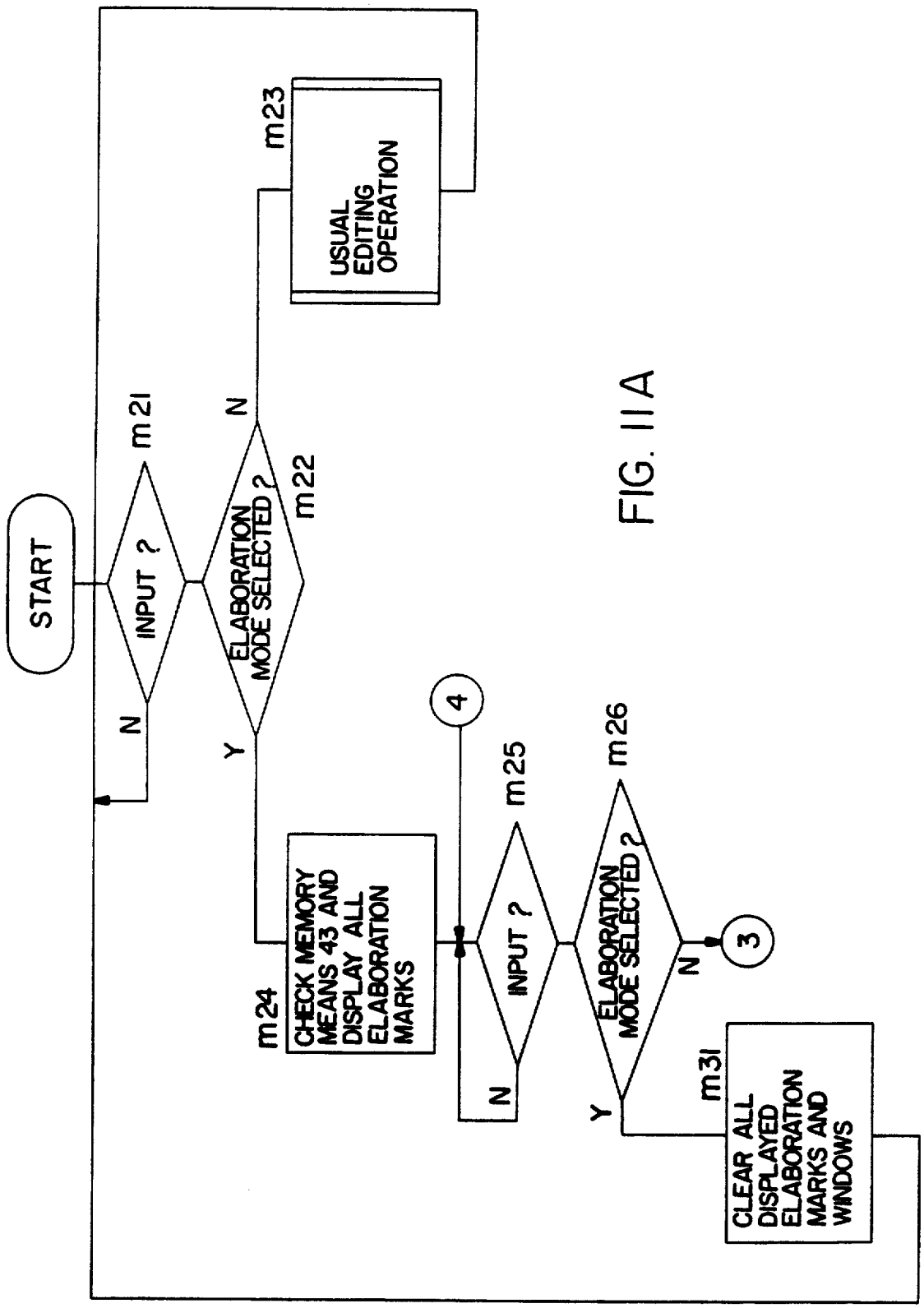
Figure 11C:
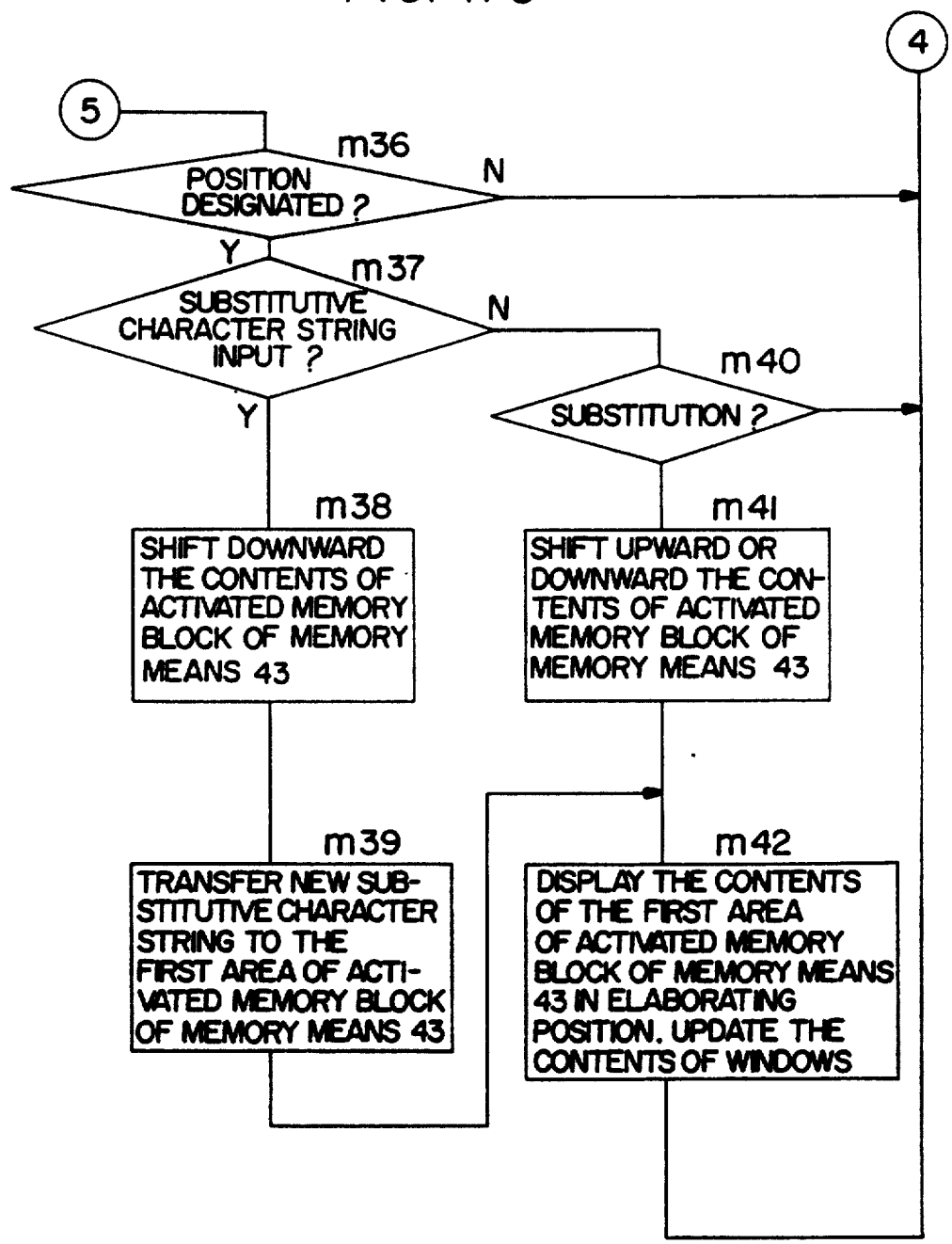

The operation of the second embodiment will be described referring to FIGS. 11A to 11C. Steps m21, m22 and m23 are the same as the steps m1, m2 and m3 in FIG. 6A. When the elaboration mode is selected, elaboration marks <E> are displayed as shown in FIGS. 8 and 9 (step m24). The positions of the displayed elaboration marks correspond to the contents of the memory portions 56 and 61 in the memory blocks 51a and 51b storing substitutive character strings, thereby enabling the rapid recognition of the positions at which the elaboration has been conducted.

When one of the elaboration marks <E> is designated using the character string designating means 46 in the step m25 which is the input wait step in the elaboration mode, the state proceeds to the step m28 via the steps m26 and m27. In the step m28, the flags 57 and 62 are checked to see whether their states are ON or OFF, thereby recognizing that the windows W1 and W2 corresponding to the memory blocks 51a and 51b have been opened or not.

If the windows W1 and W2 for showing substitutive character strings have not been opened yet, execution moves to step m29 to display the window W1 or W2 corresponding to the contents of the memory block 51a or 51b having the positional information of the designated elaboration mark. The corresponding memory block 51a or 51b is activated and its flag 56 or 61 becomes ON. If the windows W1 and W2 for showing substitutive character strings have been opened already, the window W1 or W2 corresponding to the memory block 51a or 51b having the positional information of the designated elaboration mark is closed, and its flag 56 or 61 becomes OFF (step m30). After passing the step m29 or m30, execution returns to the input wait step in the elaboration mode (step m25).

When a new elaborating portion is designated in step m25, the state proceeds to the step m33 via the steps m26, m27 and m32 to form a new memory block in the memory means 52 and activate the newly-formed memory block. More specifically, when there has been no designation of the elaborating portion, the memory block 51a is created, and the pointer is set to the first memory area 52a.

Thereafter, in the step m34, a character string in the document buffer 42 is designated. Namely, in the document buffer 42 of FIG. 10A, the character string "possesses a simple operativity" (expression A1) which is sandwiched by two labels a1 and b1 shown in FIG. 10A is recognized as the designated character string.

The designated character string (expression A1) is transferred from the document buffer 42 to the substitutive character string memory 43 (step m35), and stored in the memory area 52a to which the pointer has been set in the step m33. At this time, the elaboration mark <E> is displayed at the vicinity of the label a1, and the window W1 for displaying substitutive character strings is opened to display "possesses a simple operativity" (expression A1). Thereafter, the state returns to the input wait mode in the step m25.

When a substitutive character string "is easy in operation" (expression A2) is entered by the input device 45 during the elaboration input wait mode, execution proceeds to the step m38 via the steps m25, m26, m27, m32, m36 and m37. The step m36 is provided to ignore an input of a substitutive character string or a substitute instruction when such an input is done between the entering into the elaboration mode and the designation of the elaborating portion. In the step m38, the contents of the memory 43 are shifted downward by one step. The expression A1 "possesses a simple operativity" which has been stored in the memory area 52a is shifted to the memory area 52b to clear the memory area 52a. Then, the newly input substitutive character string "is easy in operation" (expression A2) is stored in the memory area 52a (step m39).

The expression A2 "is easy in operation" which is the contents of the memory area 52a is transferred to the document buffer 42 to be displayed at the elaborating portion on the display 41 (step m42). The expressions A1 "possesses a simple operativity" and A2 "is easy in operation" which are the contents of the memory areas 52a and 52b are displayed in the window W1 near the elaborating portion. Then, execution returns to the step m25.

When another substitutive character string "is easy to operate" (expression A3) is entered further, the steps m38, m39 and m44 are repeated. The expression A1 "possesses a simple operativity" which has been stored in the memory area 52b is shifted to the memory area 52c. Similarly, the expression A2 "is easy in operation" which has been stored in the memory area 52a is shifted to the memory area 52b. The expression A3 "is easy to operate" is stored in the memory area 52a, and transferred to the document buffer 42 to be displayed at the elaborating portion on the display 41. The display of the window W1 is updated.

When the substitute instruction is done in the elaboration mode, execution proceeds to the step m40 via the steps m25 to m27, m32, m36 and m37. The step m40 is provided, in the elaboration mode, to ignore any input other than the inputs of the elaborating portion, substitutive character strings, and substitute instruction.

In the step m36, the contents of the memory 43 of the memory block 51a are shifted upward or downward by one step in a loop manner. When the next candidate key is operated, the contents of the memory 43 are shifted downward. The expression A3 "is easy to operate" which has been stored in the memory area 52a is shifted to the memory area 52b. The expression A2 "is easy in operation" which has been stored in the memory area 52b is shifted to the memory area 52c. The expression A1 "possesses a simple operativity" which has been stored in the memory area 52c is returned to the memory area 52a. When the previous candidate key is operated, the contents of the memory 43 are shifted upward or in the reverse direction. The expression A1 "possesses a simple operativity" which is the contents of the memory area 52a is displayed again at the elaborating portion on the display 41, and the contents of the window W1 is updated (step m42). Then, execution returns to the step m25. FIGS. 5A and 5B illustrate this status.

If the selection of the elaboration mode is done, execution returns to the step m21 via the steps m24 and m25 to restart the usual editing mode in which the sentence including the expression A1 stored in the memory area 52a at the final stage of the elaboration mode will be processed. When the elaboration mode is selected in the step m25, the elaboration marks <E> and windows W1 and W2 for displaying substitutive character strings are cleared (step m31), and execution returns to the step m31 to restart the input wait mode in the usual editing mode.

As described above, the embodiment can store the information with respect to whether substitutive character strings for the character strings in a document exist or not, and can display them at any time as required. If substitutive character strings for a designated character string are previously input, therefore, it is able to start quickly the elaboration in which the designated character string is replaced with the substitutive character strings.

Third Embodiment

Figure 12:
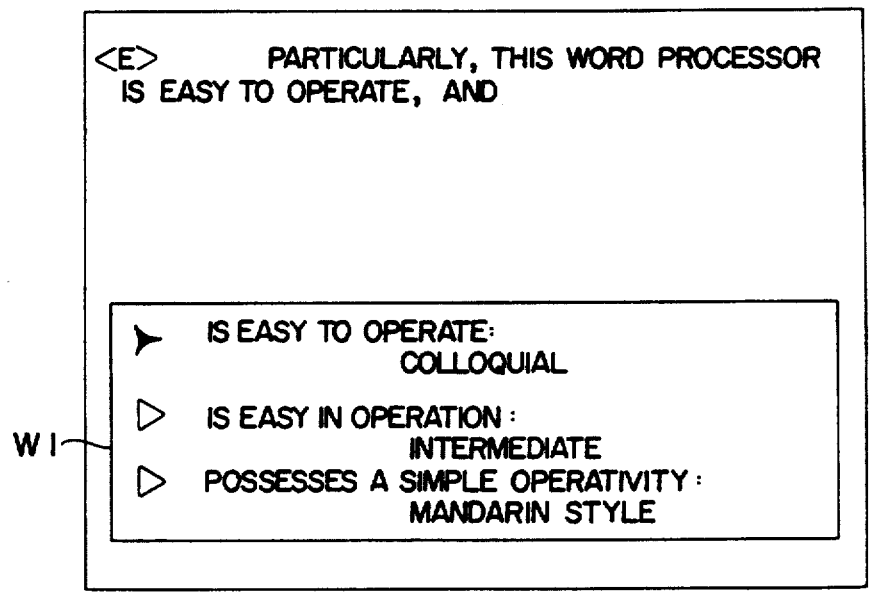
FIG. 12 is a diagram illustrating a display which shows an elaboration mark and a window indicating substitutive character strings and reference information.
Figure 13A:
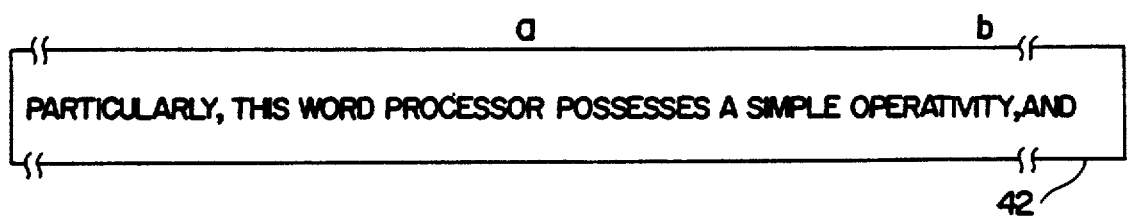
FIG. 13A is a diagram illustrating the sentence to be elaborated which is stored in a document buffer of the third embodiment.
Figure 13B:
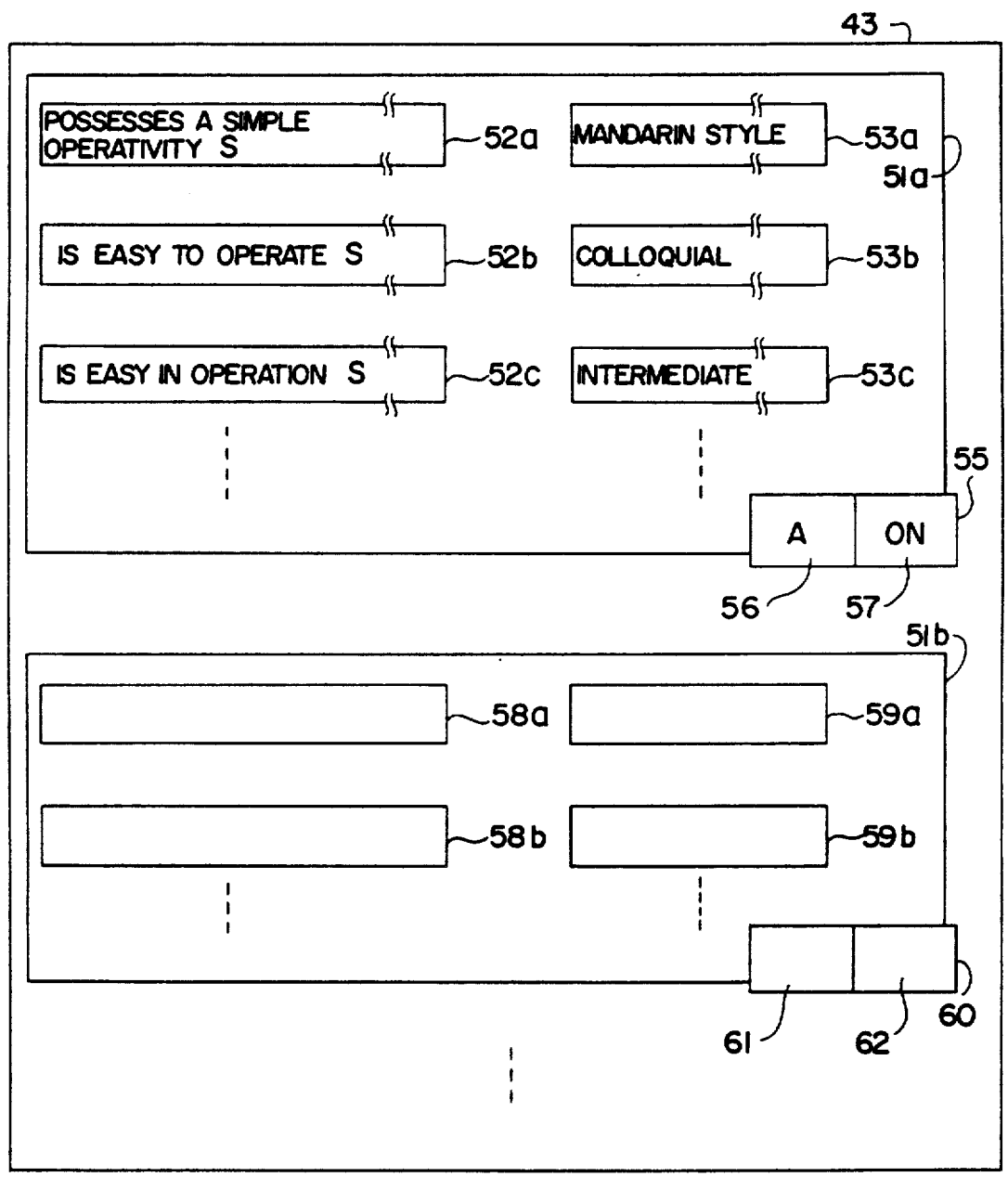
FIG. 13B is a diagram illustrating the internal arrangement of a substitutive character string memory of the third embodiment.

The third embodiment of the invention will be described below. The third embodiment also comprises components shown in FIG. 4. FIG. 13A illustrates the contents of the document buffer 42 of the third embodiment in which the sentence same as that shown in FIG. 1 is stored. FIG. 13B illustrates the internal arrangement of the substitutive character string memory 43. In this embodiment, as shown in FIG. 13B, the memory blocks 51a and 51b further comprise memory regions 53a to 53c and 59a and 59b which correspond to the memory areas 52a to 52c and 58a and 58b, respectively. The contents of the memory regions 53a to 53c or 59a and 59b are displayed in the window W1 as the reference information (FIG. 12).

Figure 14A:
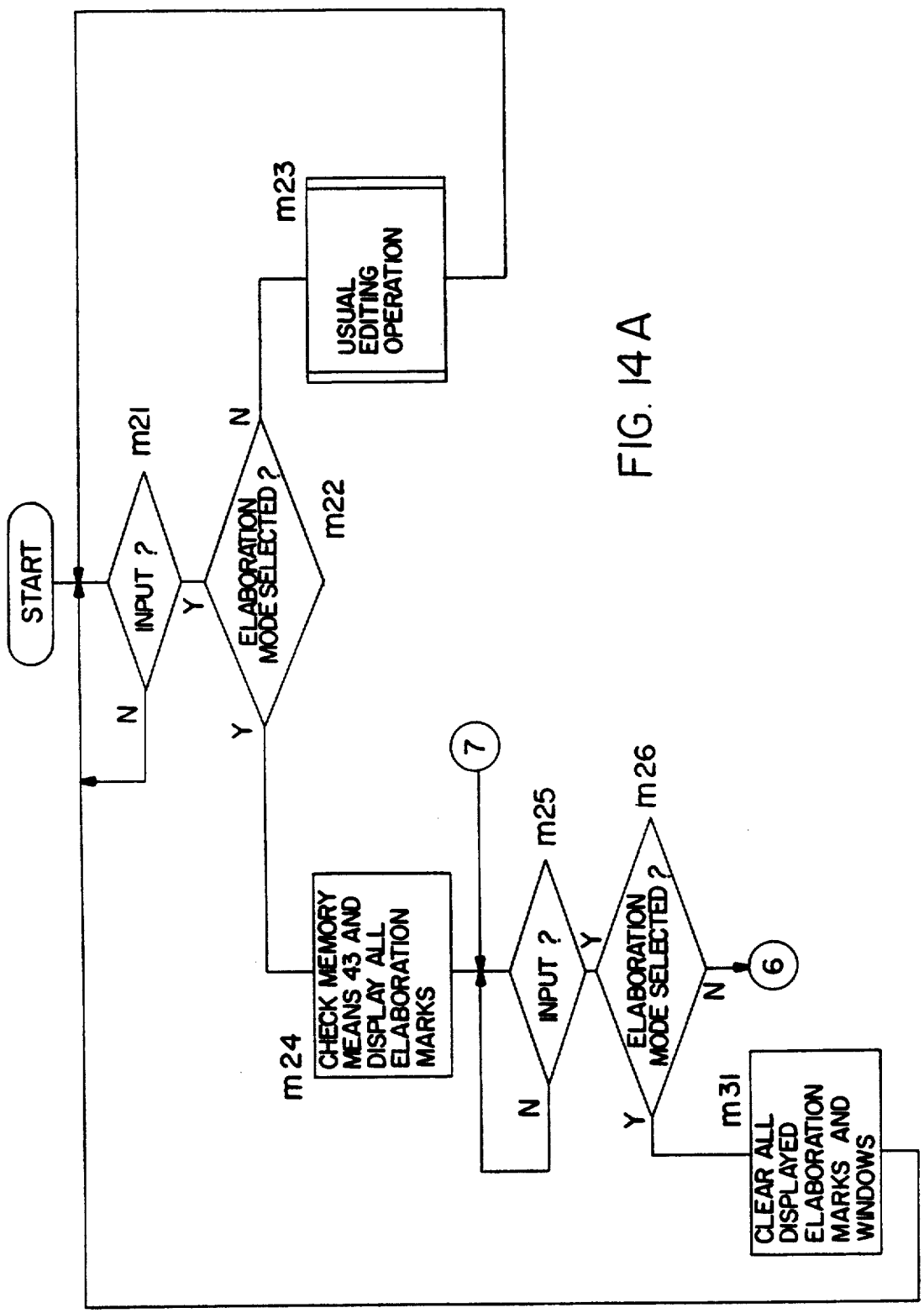

FIGS. 14A to 14C show flowcharts illustrating the operation of the third embodiment. The operation steps of the third embodiment are similar to those of the second embodiment shown in FIGS. 11A to 11C except that a flow comprising the steps m43, m44 and m45 is added.

When the memory block 51a is activated, reference information about the substitutive character string stored in the first memory area 52a (i.e., the expression shown in the elaborating portion) of the activated memory block 51a can be input after selecting the information input mode (step m43) by the designating means 46. The input information is stored in the first memory region 53a and displayed in the window W1. By shifting the contents of the first memory area 52a or updating the expression shown in the elaborating portion (steps m41 and m42), reference information for other substitutive character strings can be input. Alternatively, reference information may be input after designating the corresponding substitutive character string shown in the window W1 by the designating means 46.

According to the embodiment, information about the existence of substitutive character strings and also reference information about the substitutive character strings with respect to a designated character string can be stored and displayed at any time when required. The contents of reference information to be stored may be any kinds of information, for example, the name of the operator who have conducted the input of the substitutive character string, and comments on the style of the designated or substitutive character string (e.g., mandarin style, colloquial). Therefore, the operator can elaborate a sentence while referring to the displayed information about the substitutive character strings, thereby realizing easy and/or fine elaboration even when the same document is elaborated repeatedly or when several persons elaborate one document.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A word processor for editing selected portions of a text comprising:
   means for supplying text to be edited and for storing the text in a first memory;
   designating means, responsive to said means for supplying, for designating a portion of said text as a designated character string, the designating portion being designated by an operator of the word processor after the operator has reviewed the text to be edited;
   input means for introducing into the word processor at least one substitute character string composed by the operator after the operator has reviewed the text to be edited;
   a second memory for storing said at least one substitute character string;
   substitute means, responsive to said designating means and input means, for substituting by selection performed by the operator said at least one substitute character string, for said designated character string in said text; and
   alternative substitute string development means responsive to said substitute means for storing in said second memory said designated character string as another substitute character string for later use by said substitute means after said designated character string has been replaced in the text by said at least substitute character string.

2. The word processor of claim 1 wherein the second memory is composed of a plurality of blocks each block including:
   (a) a plurality of memory areas;
   (b) a memory portion for storing positional information corresponding to the location of the designated character string in the text; and
   (c) a flag for indicating whether contents of an associated block is displayed in windows.

3. The word processor of claim 1 wherein said designating means includes means for identifying the designated portion of the text by the use of labels, a first label at the start of said designating portion and a second label at a termination of said designating portion.

4. The word processor of claim 1 wherein said designating means designates a variable size of said text as a designated character string.

5. The word processor of claim 1 further including a display.

6. The word processor of claim 1, wherein said designated portion and said substitute portion are expressions of a plurality of words.

7. The word processor of claim 6 wherein said designating means includes means for identifying the designating portion of said text by the use of labels, a first label at the start of said designating portion and a second label at a termination of said designating portion.

8. The word processor of claim 6 further including means for storing said designated character string and said at least one substitute character string in a hierarchy order of sequence.

9. The word processor of claim 8 wherein there are a plurality of substitute character strings and the hierarchy order of sequence changes when different ones of said plurality of substitute character strings are used in place of said designated character string in the text.

10. A word processor for editing selected portions of a text comprising:
   means for supplying text to be edited and for storing the text in a first memory;
   designating means, responsive to said means for supplying, for designating a portion of said text as a designated character string, the designating portion being designated by an operator of the word processor after the operator has reviewed the text to be edited;
   input means for introducing into the word processor a plurality of substitute character strings composed by the operator after the designated portion has been designated;
   second memory means responsive to said input means for storing said plurality of substitute character strings;
   substitute means, responsive to said designating means and input means, for substituting by selection performed by the operator at least one of said plurality of substitute character string for said designated character string;
   first display means responsive to said designating means for displaying a mark in the vicinity of said designated character string, said mark indicating that said substitutive character strings are stored in said second memory means;
   second display means responsive to said input means for displaying said substitute character strings; and
   alternative substitute development means, responsive to said substitute means, for storing in said second memory said designated character string as another said substitute character string for later use by said substitute means.

11. A word processor of claim 10 wherein said designating means designates a variable size of the text as a designated character string.

12. The word processor of claim 10 wherein said second memory means stores two or more sets of said substitute character strings.

13. A word processor of claim 12, wherein said first display means displays a plurality of said marks.

14. A word processor of claim 12, wherein said second display means displays two or more sets of said substitute character strings.

15. A word processor for editing selected portions of a text comprising:

means for supplying text to be edited;

designating means, responsive to said means for supplying, for designating a portion of said text as a designated character string the designating portion being designated by an operator of the word processor after the operator has reviewed the text to be edited;

first input means for introducing a plurality of substitute character strings composed by the operator after the designated portion has been designated;

substitute means, responsive to said designating means and said first input means, for substituting by selection performed by the operator at least one of said substitute character strings, second input means responsive to said first input means for inputting reference information corresponding to said substitute character strings;

first memory means responsive to said first input means for storing said substitute character strings;

second memory means responsive to said second input for storing said reference information;

first display means responsive to said designating means for displaying at least one mark indicating that said substitute character strings are stored in said first memory;

second display means responsive to said first and second input means for displaying said substitute character strings and said reference information; and alternative substitute means responsive to said substitute means for storing said designating character string in said first memory means as another said substitute character string for later use by said substitute means.

16. A word processor according to claim 15, wherein said first memory means stores two or more sets of said substitute character strings; and said second memory means stores two or more sets of said reference information.

17. A word processor according to claim 15, wherein said first display means displays a plurality of said marks.

18. A word processor according to claim 15 wherein said second display means displays two or more sets of said substitute character strings and two or more sets of said reference information.

19. A word processor according to claim 15, wherein said designating means designates a variable size of said text as a designated character string.

* * * * *